US010832303B2

(12) United States Patent
Sweeney

(10) Patent No.: US 10,832,303 B2
(45) Date of Patent: Nov. 10, 2020

(54) REMOVAL OF LISTINGS BASED ON SIMILARITY

(71) Applicant: EBAY INC., San Jose, CA (US)

(72) Inventor: Kane Sweeney, San Jose, CA (US)

(73) Assignee: eBay Inc., San Jose, CA (US)

( * ) Notice: Subject to any disclaimer, the term of this patent is extended or adjusted under 35 U.S.C. 154(b) by 357 days.

(21) Appl. No.: 15/068,194

(22) Filed: Mar. 11, 2016

(65) Prior Publication Data

US 2017/0262918 A1    Sep. 14, 2017

(51) Int. Cl.
*G06Q 30/00* (2012.01)
*G06Q 30/06* (2012.01)
*G06F 16/248* (2019.01)
*G06Q 10/02* (2012.01)

(52) U.S. Cl.
CPC ....... *G06Q 30/0625* (2013.01); *G06F 16/248* (2019.01); *G06Q 10/02* (2013.01); *G06Q 30/0643* (2013.01)

(58) Field of Classification Search
CPC ....................................... G06Q 30/0601–0645
See application file for complete search history.

(56) References Cited

U.S. PATENT DOCUMENTS

| | | |
|---|---|---|
| 2002/0082879 A1 | 6/2002 | Miller et al. |
| 2007/0192294 A1* | 8/2007 | Ramer .................... G06Q 30/02 |
| 2011/0040656 A1 | 2/2011 | Groetzinger et al. |
| 2012/0078667 A1 | 3/2012 | Denker et al. |

(Continued)

FOREIGN PATENT DOCUMENTS

| | | |
|---|---|---|
| JP | 2001-357273 A | 12/2001 |
| KR | 10-2005-0016653 A | 2/2005 |

(Continued)

OTHER PUBLICATIONS

"TickPick, New Ticket Buying App From TickPick Ranks Best Buys By Price And Location, Unlike Any Other Ticket Buying App in Marketplace, Aug. 21, 2014, PR Newswire, PDF pp. 1-2" (Year: 2014).*

(Continued)

*Primary Examiner* — William J Allen
*Assistant Examiner* — Maria S. P. Heath
(74) *Attorney, Agent, or Firm* — Shook, Hardy & Bacon L.L.P.

(57) ABSTRACT

A method of generating a user-interface to be displayed at a remote location may include receiving a search request for an item listing and retrieving a first listing and a second listing based on the search request, determining a similarity score between the first and second listings that is based on multiple properties common to the first and second listings, and generating instructions to be transmitted to a remote location to generate a user interface to be displayed at the remote location, the user interface including the first listing, the instructions excluding the second listing from a list of results displayed on the user interface based on the similarity score exceeding a threshold and the first listing including superior values in at least one of the plurality of properties common to the first and second listings. The method may also include transmitting the instructions to the remote location for display.

20 Claims, 6 Drawing Sheets

(56) References Cited

U.S. PATENT DOCUMENTS

| | | | |
|---|---|---|---|
| 2012/0166960 A1* | 6/2012 | Salles | G06Q 30/00 715/738 |
| 2013/0024431 A1* | 1/2013 | Parthasarathy | G06F 17/30663 707/692 |
| 2013/0144665 A1* | 6/2013 | Denker | G06Q 10/02 705/5 |
| 2013/0159030 A1 | 6/2013 | Tattenbaum et al. | |
| 2014/0009366 A1 | 1/2014 | Chang | |
| 2014/0032250 A1 | 1/2014 | Oxenham et al. | |
| 2014/0304104 A1 | 10/2014 | Ladue et al. | |
| 2015/0039473 A1* | 2/2015 | Hu | G06O 30/0635 705/26.62 |
| 2015/0066579 A1 | 3/2015 | de Paris et al. | |
| 2015/0134377 A1 | 5/2015 | Flahive et al. | |
| 2015/0186973 A1* | 7/2015 | Athimoolam | G06Q 30/0625 705/26.62 |
| 2015/0287119 A1* | 10/2015 | Bhan | G06Q 30/0629 705/5 |

FOREIGN PATENT DOCUMENTS

| | | |
|---|---|---|
| KR | 10-2007-0014295 A | 2/2007 |
| KR | 10-2011-0085774 A | 7/2011 |
| KR | 10-2013-0056436 A | 5/2013 |
| WO | 2008/023270 A2 | 2/2008 |
| WO | 2011/159811 A2 | 12/2011 |
| WO | 2017/155647 A1 | 9/2017 |

OTHER PUBLICATIONS

International Search Report, as issued in connection with International Patent Application No. PCT/US2017/016491, dated Apr. 14, 2017, 2 pgs.

International Written Opinion, as issued in connection with International Patent Application No. PCT/US2017/016491, dated Apr. 14, 2017, 6 pgs.

Extended European Search Report R\received for European Patent Application No. 17763708.9, dated Jul. 23, 2019, 7 pages.

Office Action received for Korean Patent Application No. 10-2018-7029235, dated Mar. 31, 2020, 12 pages (6 pages of English Translation).

Response to Extended European Search Report filed on Jan. 29, 2020, for European Patent Application No. 17763708.9, dated Jul. 23, 2019, 12 pages.

International Preliminary Report on Patentability received for PCT Application No. PCT/US2017/016491, dated Sep. 20, 2018, 8 pages.

* cited by examiner

| Ticket Listings | | | | | |
|---|---|---|---|---|---|
| Section | Row | Seat | Quantity | Price | More |
| Infield 12 | 25 | 2-4 | 3 | $65.44 | |
| Infield 12 | 25 | 8 | 1 | $55.00 | |
| Infield 12 | 24 | 1-3 | 3 | $70.00 | |
| Infield 13 | 1 | 22 | 1 | $75.55 | |
| Infield 14 | 1 | 1 | 1 | $70.44 | |

*FIG. 2A*

| Ticket Listings | | | | | |
|---|---|---|---|---|---|
| Section | Row | Seat | Quantity | Price | More |
| Infield 12 | 25 | 2-4 | 3 | $65.44 | |
| Infield 12 | 25 | 8 | 1 | $55.00 | |
| Infield 14 | 1 | 1 | 1 | $70.44 | |

*FIG. 2B*

REMOVAL OF LISTINGS BASED ON SIMILARITY

FIELD

The embodiments discussed herein are related to the removal of listings based on similarity.

BACKGROUND

With the large volume of listings of goods, services, and the like available for purchase on the Internet, a user can very easily become overwhelmed with a presented number of listings. For example, a user may search for an item for sale and be presented with thousands of listings.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which:

FIG. 2A illustrates an example of a first configuration of a user interface;

FIG. 2B illustrates an example of a second configuration of the user interface of FIG. 2A;

DESCRIPTION OF EMBODIMENTS

Some embodiments of the present disclosure may relate to removal of listings based on similarity to another listing. For example, if a user submits a query for a listing of goods or services for sale, such as tickets to an event, traditionally the user may be provided with every possible listing that meets the criteria of the search request sent by the user. However, such a query may result in an unusable or distractingly large number of results. In some embodiments of the present disclosure, some listings will be culled, removed, truncated, or otherwise excluded from the list of results presented to the user based on similarity to another listing that is displayed to the user. For example, if two tickets were retrieved as meeting the search request of the user, and both tickets were on the same row with one being fifteen dollars less than the other, only the less expensive ticket may be presented to the user because of the superiority in price of the less expensive ticket. The more expensive ticket may be excluded from the view of the user.

By removing listings from query results, a number of benefits may be achieved. For example, a user may have a shorter list of more pertinent listings for their review and selection, increasing the likelihood of the user purchasing from the listings. As another example, because the list of results is shortened, less information may be transmitted to and stored by the user, preserving bandwidth and storage requirements of the user. As an additional example, if the user is using a device with constrained or limited display properties, for example a mobile device, the more pertinent results may be more prominently and easily viewable on the limited display.

Figure 1:
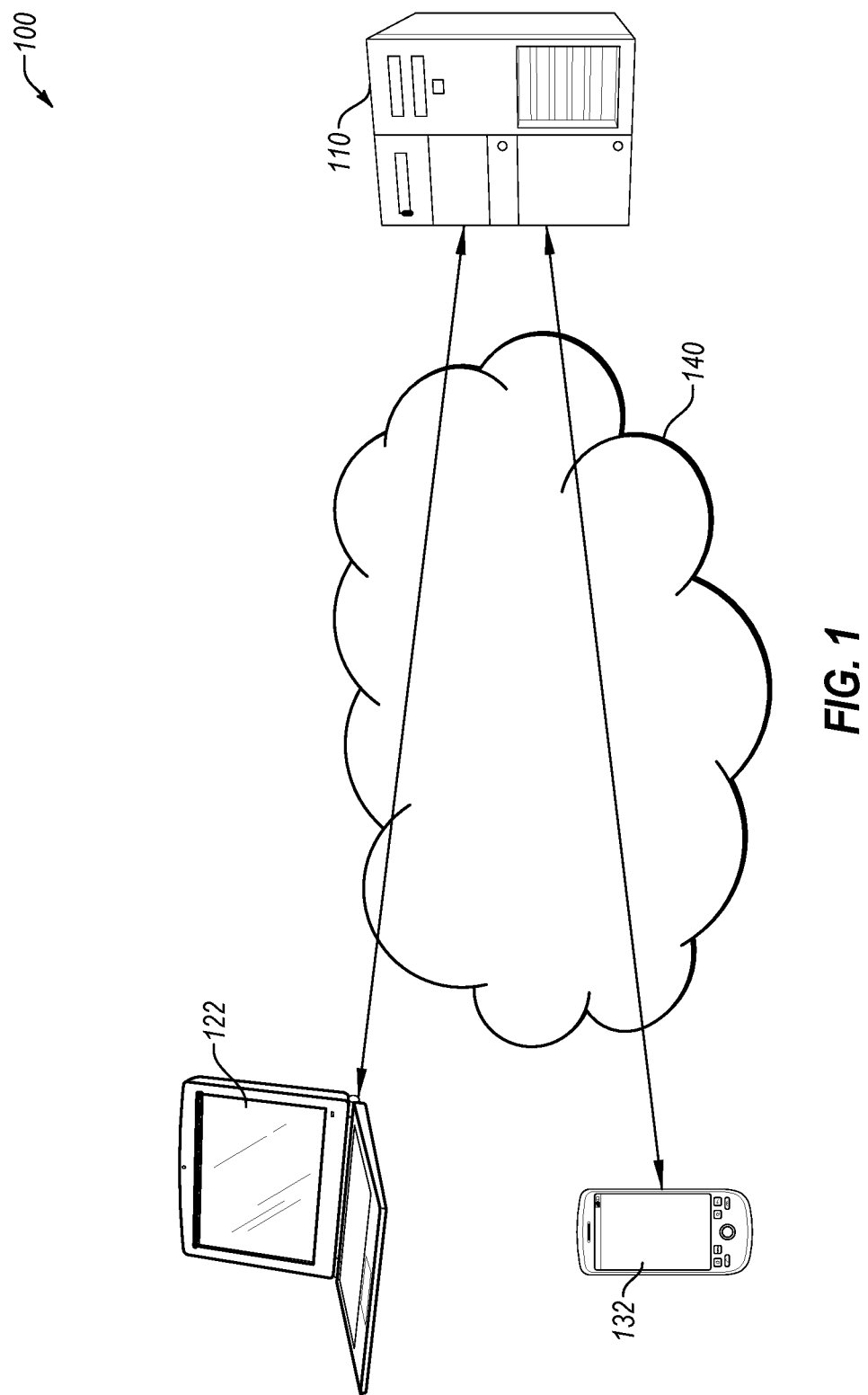
FIG. 1 illustrates an example system that may be used to present listings to a user.

Turning to the figures, FIG. 1 illustrates an example system 100 that may be used to present listings to a user, in accordance with one or more embodiments of the present disclosure. The system 100 may include a server 110, a first device 120 with a display 122, a second device 130 with a display 132, and a network 140. The first device 120 and/or the second device 130 may submit a search request or otherwise query the server 110 for listings of goods or services for sale. The server 110 may generate instructions that direct or instruct the requesting device to generate a user interface to be displayed at the requesting device.

For example, a user operating the first device 120 may request a listing of tickets for sale at a given venue on a given date. The request may be transmitted from the first device 120 over the network 140 to the server 110. The server 110 may retrieve all listings of tickets at the given venue on the given date as a first set. The server 110 may reduce the number of results to be displayed by removing listings from the first set. For example, for two listings in the first set, the server 110 may compare properties in common between the two listings. Examples of such properties may include date, price, location properties (e.g., venue, seat, row, etc.), view (e.g., obstructed, elevated, normal), delivery method (e.g., will-call, deliver by mail, print), quantity (e.g., two tickets, three tickets, etc.), or payment method (e.g., credit card, PayPal®, cash-on-delivery). If a given listing exceeds a similarity threshold with another listing to be displayed, one of the listings may be removed. In these and other embodiments, the superior listing may be retained for display to the user. Additionally or alternatively, the inferior listing may be removed from the set or otherwise excluded from being provided to the user. For example, the inferior listing may be transmitted to the user's device but flagged in such a way that the inferior listing is not displayed.

In some embodiments, the similarity threshold may be based on a single property (e.g., same row), multiple properties (e.g., row, price, and view), or a comparison of properties such as proximity (e.g., within fifteen feet of another seat, within three rows of another seat). The similarity threshold may be a default threshold set by the server 110, for example by being pre-selected by an administrator, or may include a set of parameters or filters selected by the user. For example, a user at the first device 120 may select a threshold that includes tickets within three rows of each other, within ten percent of the same price, and with the same type of view. In such an embodiment, the server 110 may remove all but one listing from the group of listings that crossed the similarity threshold. Stated another way, a first listing that fulfills search requirements of a user may be placed in a set of listings to be displayed. A next listing that also fulfills the search requirements may also be selected. If the next listing exceeds the similarity threshold, only one of the first or next listings may be in the set of listings to be displayed.

In some embodiments, the similarity threshold may include a weighting factor for one or more of the properties. For example, a row property may be weighted differently than a price property such that variations in price may more significantly affect whether two listings when compared exceed the similarity threshold.

In some embodiments, when a second listing exceeds the similarity threshold with respect to a first listing, a determination may be made as to which of the first and second listings is superior. For example, for first and second listings for tickets that are on the same row for an event but have different prices, the lower priced ticket may be superior. In some embodiments, some properties may have a reasonably clear superior value. For example, a closer row, a lower price, or a better/more clear view, etc. may provide for a superior listing. Additionally or alternatively, some properties may not have a clear superiority position, such as payment method, delivery method, etc., as such properties may represent purchaser preference. For properties with multiple options available (e.g., a seller accepting multiple forms of payment), the more options and/or the more commonly used option may be superior. In these and other embodiments, superiority may be based on a default selection made by the server 110 (e.g., based on price and closeness to the event). Such a default may be pre-selected by a system administrator for the server 110. Additionally or alternatively, superiority may be based on a user selecting which properties may factor in to a superiority determination between two listings. Such a selection may be selected by a user prior to submitting a search request, or stated another way, may be a pre-selection.

In some embodiments, a weighting factor may be applied to one or more of the properties in determining superiority. For example, a price difference may be counted more significantly than a row difference, e.g., a first ticket on the row directly behind a second ticket with a fifteen percent price difference may be superior and a third ticket two rows behind the first ticket with a fifteen percent price difference may be superior, and a fourth ticket four rows behind the first ticket with a fifteen percent price difference may be inferior. In some embodiments, price may be the only property used in determining superiority after the similarity threshold has been exceeded with respect to two listings.

In some embodiments, superiority between two listings may be determined by comparing values of properties in a sequential order. For example, price may be compared first, followed by closeness to the venue, etc. If two listings are determined to be indistinguishable, the first listing read or retrieved by the server 110 may be included in the user interface and the second listing may be removed.

In some embodiments, the similarity threshold may be based at least in part on the display properties of the display of the requesting device. For example, the display 122 of the first device 120 may have a larger display area and higher resolution than the display 132 of the second device 130. If the requesting user were using the first device 120, the threshold may be higher, allowing additional listings to be presented because of the display properties of the display 122. If the requesting user were using the second device 130, the threshold may be lower, removing additional listings to be presented because of the limited display properties of the display 132.

In some embodiments, the first listing and the second listing may each represent distinct listings. Stated another way, the first listing and the second listing may not be duplicate listings for the same physical good or service for sale. Rather, the first listing and the second listing may be distinct listings, for example, listings for separate seats for an event, or two sellers selling an identically described though distinct item (e.g., two listings may describe a product identically by brand name, model number, color, etc. but may each be selling a distinct physical implementation of the product, rather than both selling the exact same physical product).

The server 110 may include any system, device, component, or combinations thereof configured to receive a search request or query regarding listings and provide results. The server 110 may additionally be configured to perform one or more of the operations described in the present disclosure, such as one or more of the operations described with respect to FIG. 5. In some embodiments, the server 110 may include a processor, a memory, and a storage device. In these and other embodiments, the server 110 may operate as part of a network-based commerce system such as eBay®, StubHub®, etc. from which the server 110 may retrieve and/or process listings. The server 110 may be implemented as any device, such as a blade server, a rack server, a desktop, a laptop, a mobile device, a tablet, etc.

The first device 120 may include any system, device, component, or combinations thereof configured to allow a user to interact with the first device 120 to request listings from the server 110, and have the listings displayed to the user at the display 122. In some embodiments, the first device 120 may include a processor, a memory, and a storage device in addition to the display 122. The first device 120 may be implemented as any device, such as a blade server, a rack server, a desktop, a laptop, a mobile device, a tablet, etc. The second device 130 may be comparable or similar to the first device 120.

The network 140 may include any device, system, component, or combination thereof configured to provide communication between one or more of the server 110, the first device 120, and the second device 130. By way of example, the network 140 may include one or more wide area networks (WANs) and/or local area networks (LANs) that enable the server 110, the first device 120, and/or the second 130 to be in communication. In some embodiments, the network 140 may include the Internet, including a global internetwork formed by logical and physical connections between multiple WANs and/or LANs. Alternately or additionally, the network 140 may include one or more cellular RF networks and/or one or more wired and/or wireless networks such as, but not limited to, 802.xx networks, Bluetooth access points, wireless access points, IP-based networks, or the like. The network 140 may also include servers that enable one type of network to interface with another type of network. Additionally or alternatively, the network 140 may include an Intranet, or one or more computing devices in communication within an organization or an in otherwise secure manner.

Modifications, additions, or omissions may be made to FIG. 1 without departing from the scope of the present disclosure. For example, the system 100 may include more or fewer elements than those illustrated and described in the present disclosure. For example, the system 100 may include any number of devices or servers. As another example, the system 100 may include multiple or alternative servers hosting listings that the server 110 may query or otherwise request results from in response to a search request received from a user.

FIGS. 2A and 2B illustrate an example of a first and second configuration of a user interface 200a and 200b, in accordance with one or more embodiments of the present disclosure. FIG. 2A may illustrate a user interface 200a without removing any listings, and FIG. 2B may illustrate a user interface 200b after removing listings in accordance with the present disclosure.

For example purposes, the user interfaces 200a and 200b illustrated in FIGS. 2A and 2B illustrate listings of tickets for an event at a baseball diamond. The user interfaces 200a and 200b may convey to the user one or more properties of the listings, such as Section, Row, Seat, Quantity (Qty), and Price as illustrated in FIGS. 2A and 2B. The user interfaces 200a and 200b also include a More link to allow the display of additional properties besides those illustrated.

In FIG. 2A, the user interface 200a includes a first listing 210, a second listing 220, a third listing 230, a fourth listing 240, and a fifth listing 250. For purposes of the example, the first listing 210 and the second listing 220 may not exceed a similarity threshold with respect to each other. The second listing 220 may be more than ten percent different in price than the first listing 210. Thus, despite the first listing 210 and the second listing 220 being on the same row in the same section, they may not be similar. As another example, if quantity were a factor in the similarity analysis, the first listing 210 and the second listing 220 may not exceed the similarity threshold because of a difference in quantity. As an additional example, the similarity threshold may be based on both quantity and price, and the first and second listings 210 and 220 may not exceed the similarity threshold. When the first and second listings 210 and 220 do not exceed the similarity threshold, both of the first and second listings 210 and 220 may be included in the user interface 220b (as reflected in FIG. 2B).

Following the example in FIGS. 2A and 2B, the third listing 230 may exceed the similarity threshold with respect to the first listing 210. For example, the third listing 230 and the first listing 210 may be in the same section and within one row of each other. Additionally, the third listing 230 and the first listing 210 may have the same quantity and may be within ten percent of the same price. Thus, the first and the third listings 210 and 230 may exceed the similarity threshold.

Based on the first listing 210 and the third listing 230 exceeding the similarity threshold, a determination may be made as to which of the two listings is superior. For example, the third listing 230 may have a superior row value and an inferior price value when compared to the first listing 210. If price is a primary factor used in determining superiority, the third listing 230 may be removed from the display (as reflected in FIG. 2B). As an alternative example, if row difference were weighted more substantially for a particular user, the first listing 210 may be removed and only the third listing 230 displayed on the user interface (not illustrated).

Continuing the example of FIGS. 2A and 2B, the fourth and fifth listings 240 and 250 may not exceed the similarity threshold when compared with any of the first, second, or third listings 210, 220, and 230. When the fourth and fifth listings 240 and 250 are compared to each other for a similarity threshold based on absolute distance between two seats, the fourth and fifth listings 240 and 250 may exceed the similarity threshold. For example, the fourth and fifth listings 240 and 250 may be in different sections (Infield 13 vs. Infield 14) but they are on the same row and the fourth listing 240 may be at the end of Row 1 in the Infield 13 section and the fifth listing 250 may be at the beginning of Row 1 in the Infield 14 section, and thus may be in proximity to each other exceeding the similarity threshold. Additionally, the fourth and fifth listings 240 and 250 may be within ten percent of the same price. Thus, the comparison of the fourth and fifth listings 240 and 250 may exceed the similarity threshold because of the proximity based on absolute distance between the two seats.

Based on a comparison of the fourth listing 240 and the fifth listing 250 exceeding the similarity threshold, a determination may be made as to which of the two listings is superior. For example, if superiority were based only on price, the fifth listing 250 may be superior. Based on the fifth listing 250 being superior, the fourth listing 240 may be removed or excluded from the user interface 200b (as reflected in FIG. 2B).

As illustrated in FIG. 2B, the third listing 230 may be removed because the third listing 230 exceeded the similarity threshold with the first listing 210, and the first listing 210 was superior. Additionally, the fourth listing 240 may be removed because the fourth listing 240 exceeded the similarity threshold with the fifth listing 250, and the fifth listing 250 was superior.

In some embodiments, the user interface 200b may include a feature to cause the display to include the excluded listings. For example, after invoking such a feature the third and fourth listings 230 and 240 may be added to the user interface.

Modifications, additions, or omissions may be made to FIGS. 2A and 2B without departing from the scope of the present disclosure. For example, the user interfaces 200a and/or 200b may include more or fewer elements than those illustrated and described in the present disclosure. For example, the user interface 200b may display more properties than those illustrated. As another example, the listings may be for products or services, rather than tickets. As an additional example, the user interface 200a and/or 200b may be a portion of a larger user interface that may include an interactive visual element, such as that illustrated in FIG. 3 or 4.

Figure 3:
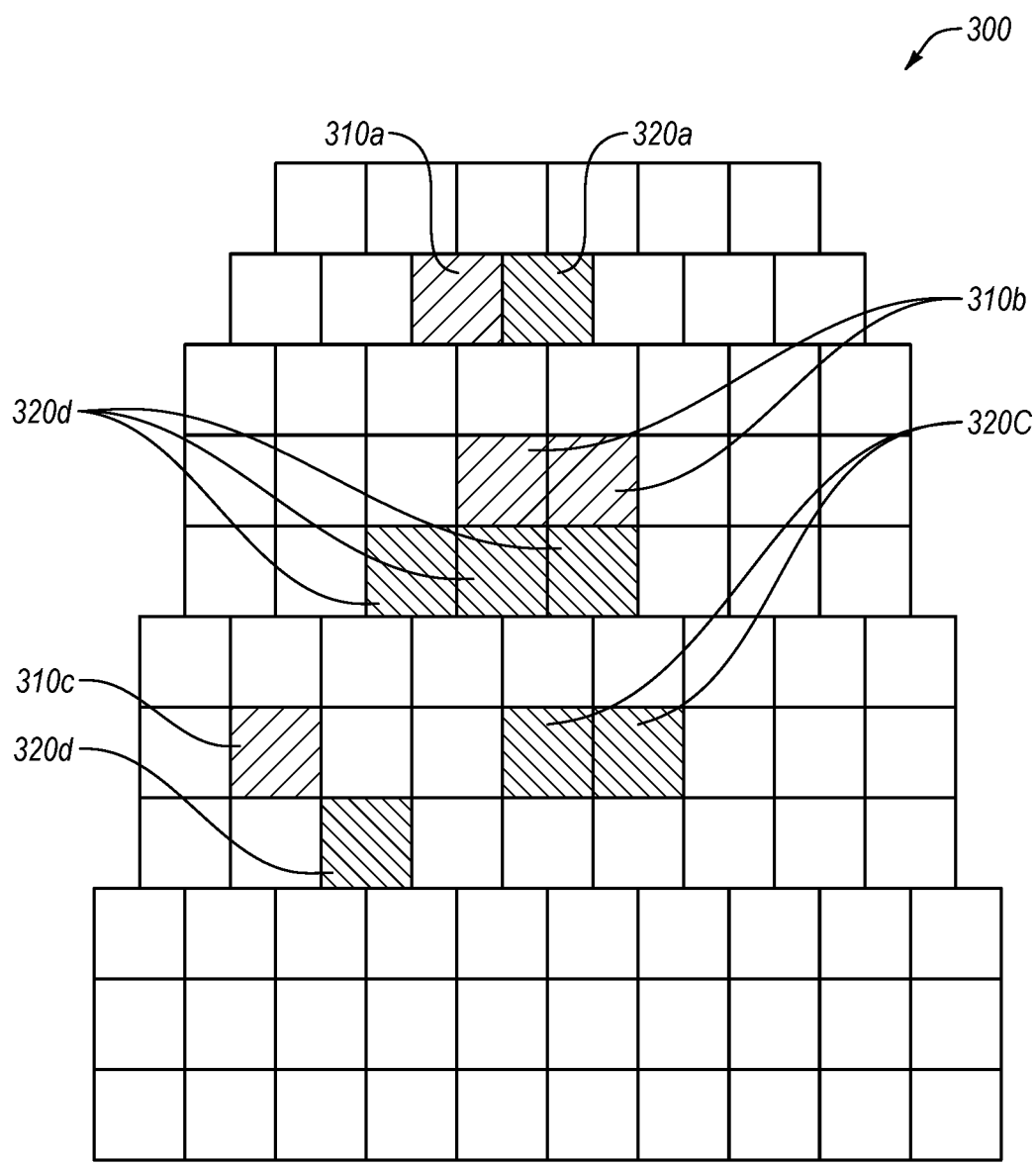
FIG. 3 illustrates an example interactive visual element.

FIG. 3 illustrates an example interactive visual element 300, in accordance with one or more embodiments of the present disclosure. The interactive visual element 300 may be part of a user interface provided to a user. For example, the user interface may include the user interface 200b from FIG. 2B and the interactive visual element 300 from FIG. 3.

The interactive visual element 300 may represent a visual depiction of one or more listings responsive to a search request from a user. For example, if a user selected a particular region of a venue for an event for ticket sales, the interactive visual element 300 may represent an interactive map of seats in the section (as illustrated in FIG. 3). In some embodiments, the interactive visual element 300 may display listings that are displayed to the user (included listings 310) in one format while displaying listings that are excluded from the display (excluded listings 320) to the user in a different format. For example, the included listings 310 may be in a different shading, color, texture, or other visual representation to distinguish the included listings 310 from the excluded listings 320 and/or seats not for sale.

In some embodiments, the included listings 310 may have a corresponding textual description of the listing included (for example, as illustrated in FIG. 2B) while excluded listings 320 may not have a corresponding textual description (for example, as illustrated in FIG. 2B).

By way of example with reference to FIG. 3, the first row of the interactive visual element 300 may not have any seats for sale and so may be in a first format. The included listing 310a may have a corresponding textual description provided to a user and so may be displayed in a second format. The excluded listing 320a may not have a corresponding textual description provided to the user and so may be displayed in a third format. In particular, the included listing 310a and the excluded listing 320a may have exceeded a similarity threshold and the included listing 310a may have been determined to be superior.

Continuing the example, the included listings 310b and 310c may be displayed in the second format. The excluded listings 320b, 320c, and 320d may be displayed in the third format. In some embodiments, the excluded listings 320b, 320c, and 320d may be excluded listings because the excluded listings 320b, 320c, and 320d may have exceeded a similarity threshold with one or more of the included listings 310, and the included listings 310 may have been found superior. The excluded listings 320b, 230c, and 320d may be displayed in the third format.

In some embodiments, seats not for sale and/or the excluded listings 320 may be depicted in a non-descript color such as white, gray, or black, or in a color to signify they are not displayed such as red, orange, or yellow and the included listings 310 may be depicted in a brighter color such as green or yellow.

In some embodiments, the interactive visual element 300 may be implemented using code implemented by the device of the user (e.g., the first device 120 of FIG. 1). For example, the interactive visual element 300 may be implemented using JavaScript or Hypertext markup language (HTML). The device of the user may execute such user-device code. Based on the execution of the user-device code, the user may interact with the interactive visual element 300 to change a configuration of the interactive visual element 300.

For example, the interactive visual element 300 may include elements through which a user may interact with the interactive visual element 300. The user-device code executed by the device of the user may obtain the user interactions and change the configuration of the interactive visual element 300 accordingly. For example, the configuration of the interactive visual element 300 may change by changing the section of the venue displayed in the map. Alternately or additionally, the user-device code may request additional data from a server (e.g., the server 110 of FIG. 1), such as images, listings, or other information.

Modifications, additions, or omissions may be made to FIG. 3 without departing from the scope of the present disclosure. For example, the interactive visual element 300 may include more or fewer elements than those illustrated and described in the present disclosure. For example, the interactive visual element 300 may be part of a user interface that includes a textual description of included listings.

Figure 4:
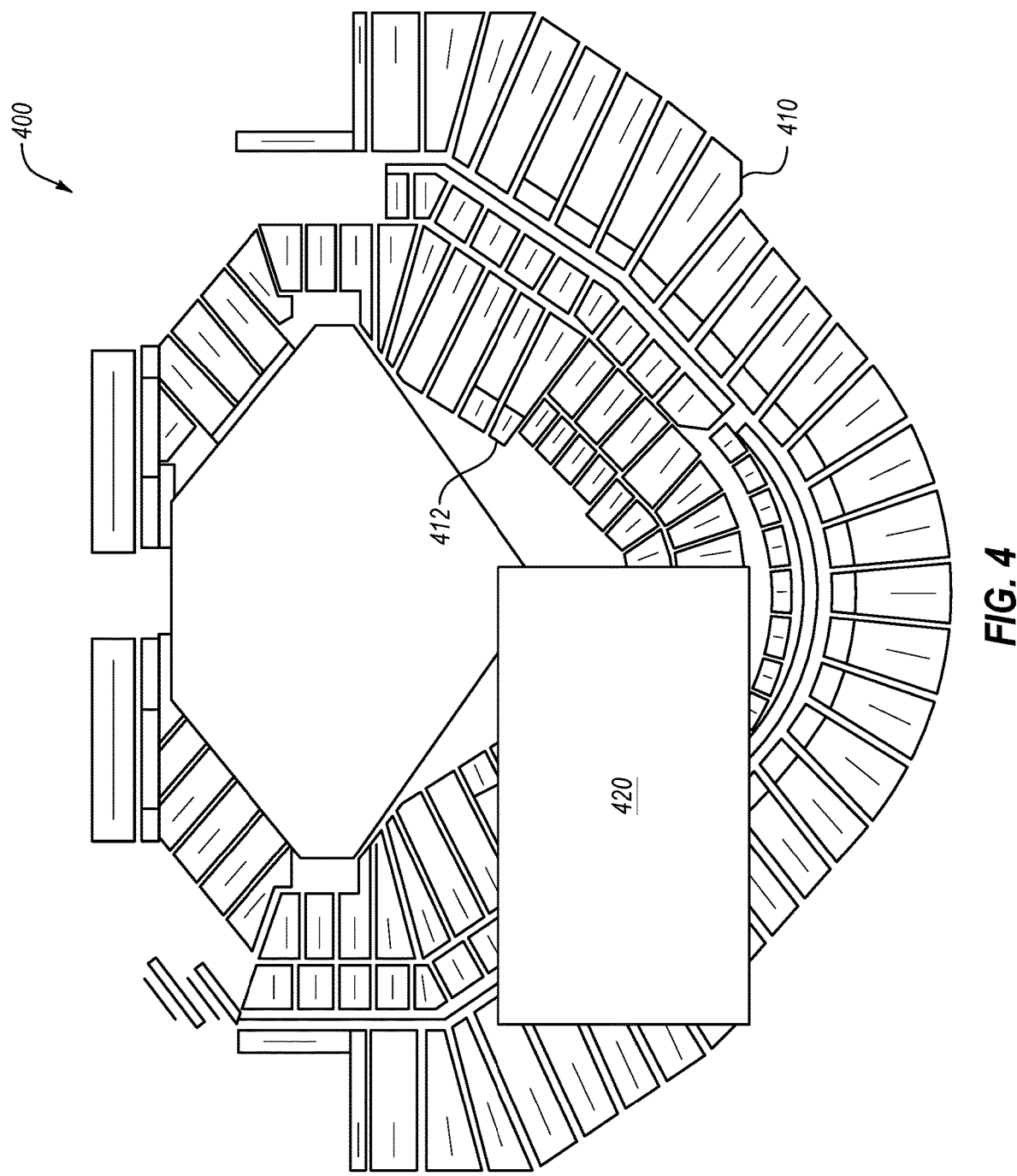
FIG. 4 illustrates another example of an interactive visual element.

FIG. 4 illustrates another example of an interactive visual element 400, in accordance with one or more embodiments of the present disclosure. The interactive visual element 400 may include a venue map 410 with one more sections (e.g., section 412) depicting a venue with listings of seats for purchase. The interactive visual element 400 may additionally include a window 420 for displaying listings.

The interactive visual element 400 may be configured such that a user displaying the interactive visual element 400 may select one or more features of the interactive visual element 400 to interact with the user interface. Interacting with the user interface may allow the user to perform a query, refine a query, examine a listing, etc. For example, if a user were to click on the section 412 of the venue map 410, the window 420 may display a textual description of listings in that section, such as that depicted by the user interface 200b of FIG. 2B.

In some embodiments, the window 420 may be sized and/or positioned to overlay portions of the venue map 410, for example, as illustrated in FIG. 4. In these and other embodiments, the window 420 may be sized and/or positioned based on the display properties of the display of the device used by the user. For displays with lower resolution and/or smaller display areas, the window 420 may overlay a larger portion of the venue map 410. For displays with high resolution and/or larger display areas, the window 420 may overlay a smaller portion of the venue map 410.

In some embodiments, the display of listings in the window 420 may exclude listings in accordance with the present disclosure. For example, if the user selected the section 412, the window 420 may exclude listings from section 412 that exceeded a similarity threshold with another listing in the section 412. In these and other embodiments, the similarity threshold may be based in part on the display properties of the display of the device used by the requesting user.

By selecting a section of the venue map 410, in some embodiments the interactive visual element 400 may display the venue map 410 replaced with a map of the selected section. For example, the interactive visual element 400 may include a map of a section as illustrated in FIG. 3 rather than the entire venue map 410 as illustrated in FIG. 4. In these and other embodiments, the window 420 may overlay a portion of the map of the section.

In some embodiments, the venue map 410 may be formatted in a similar manner to that described with reference to FIG. 3. For example, portions of the venue map 410 may be formatted a first way for seats included in the window 420, and a second way for listings excluded from the window 420. In some embodiments, the seats included in the window 420 may be formatted in the same manner as the rest of the venue map 410. Additionally or alternatively, the seats excluded from the window 420 may be formatted in the same manner as the rest of the venue map 410. As another example, the seats excluded from the window 420 and the seats included in the window 420 may be formatted differently from each other and from the rest of the venue map 410.

Modifications, additions, or omissions may be made to FIG. 4 without departing from the scope of the present disclosure. For example, the interactive visual element 400 may include more or fewer elements than those illustrated and described in the present disclosure. For example, the interactive visual element 400 may include additional features, links, or aspects of interacting with the interactive visual element 400 not illustrated.

Figure 5A:
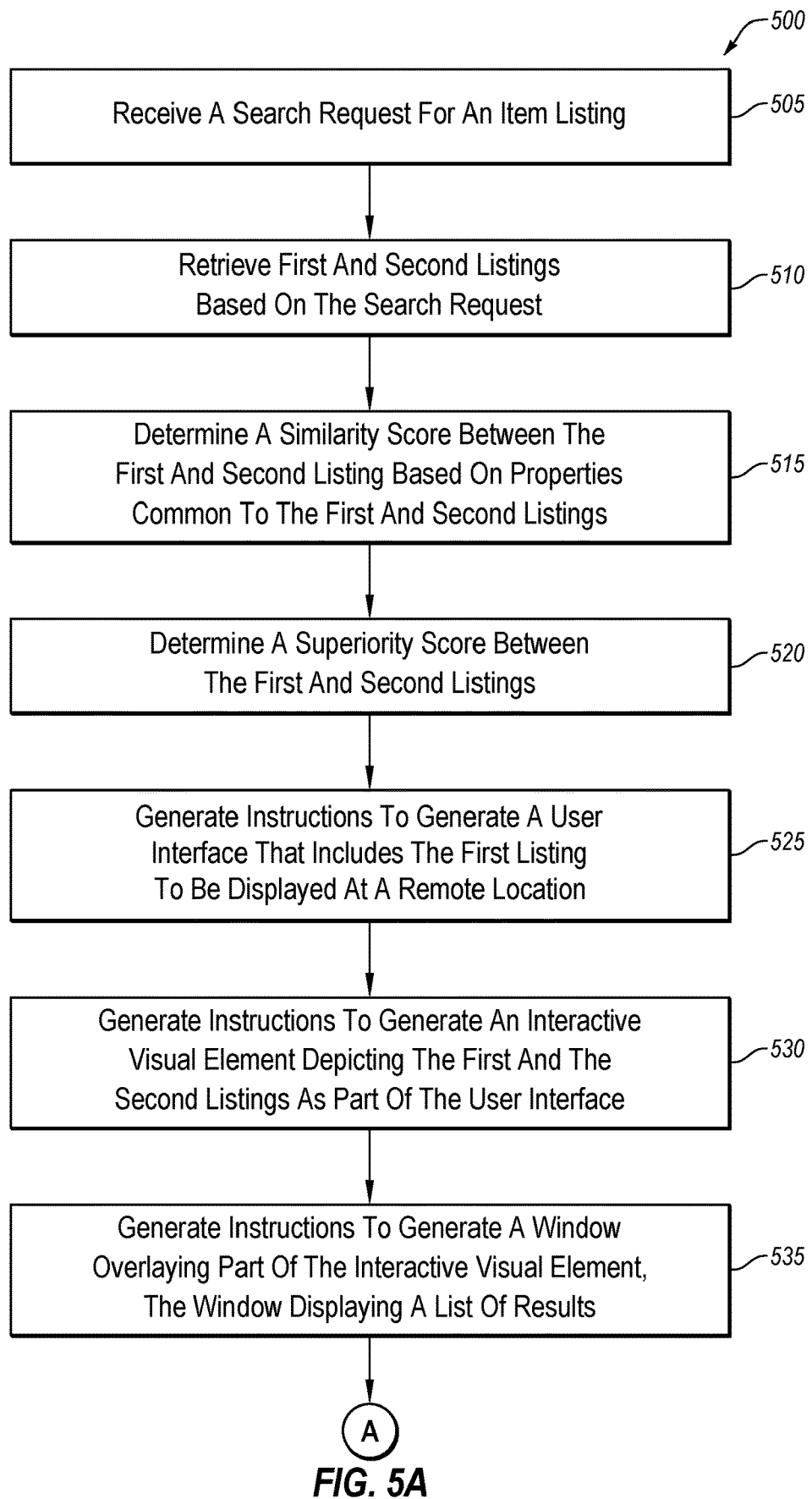
FIGS. 5A-5B include a flowchart of an example computer-implemented method of removal of listings based on similarity.
Figure 5B:
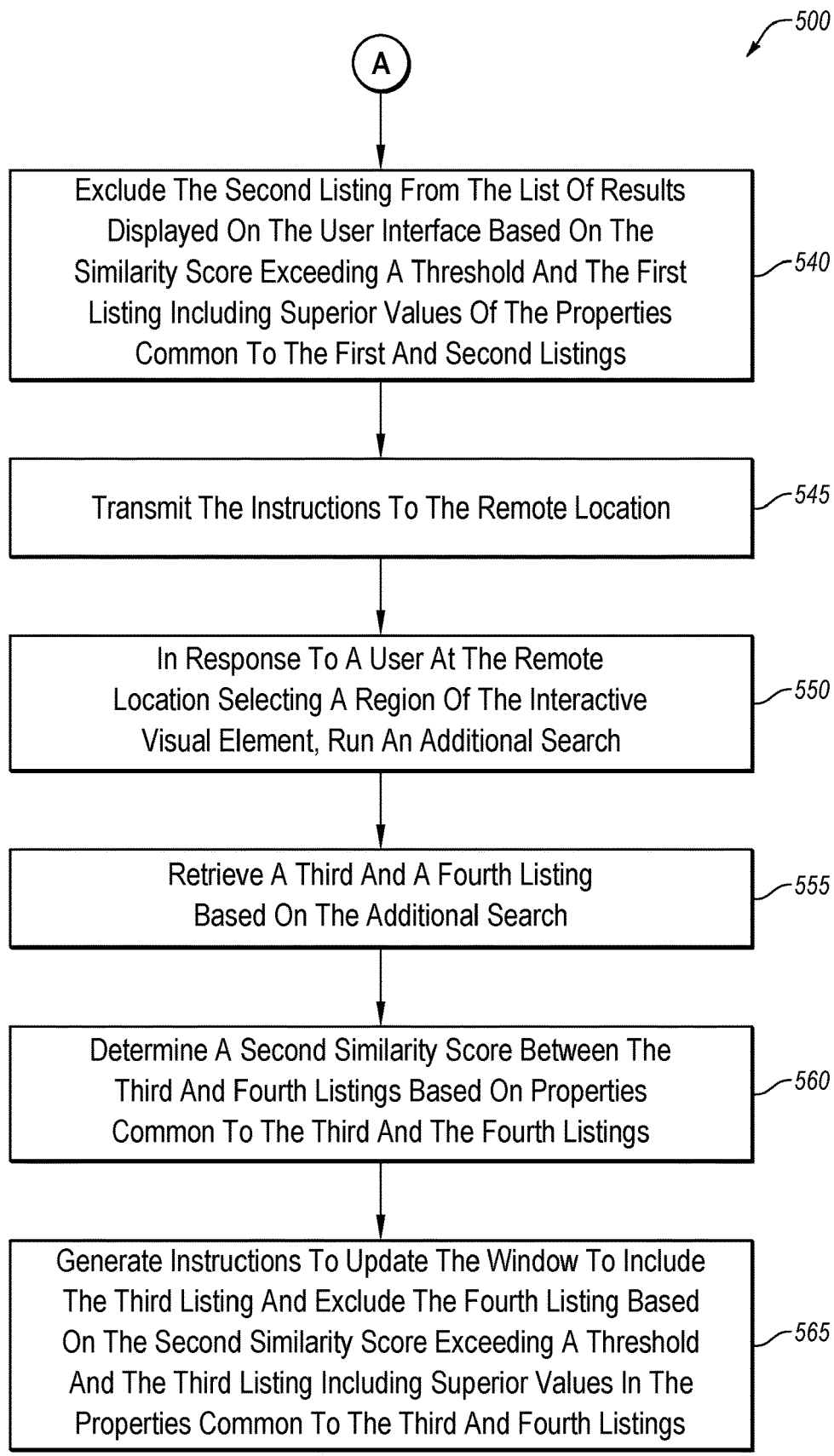

FIGS. 5A and 5B include a flowchart of an example computer-implemented method 500 of removal of listings based on similarity. The method 500 may be performed by any suitable system, apparatus, or device. For example, the system 100 of FIG. 1 may perform one or more of the operations associated with the method 500. Although illustrated with discrete blocks, the steps and operations associated with one or more of the blocks of the method 500 may be divided into additional blocks, combined into fewer blocks, or eliminated, depending on the desired implementation.

At block 505, a search request may be received for a listing. For example, a user may submit a request via a device (e.g., the first device 120 or the second device 130 of FIG. 1) to a server (e.g., the server 110 of FIG. 1) to be provided with listings, such as items for sale, tickets for sale, etc. In some embodiments, such a request may be submitted by the user interacting with an interactive visual element (e.g., selecting a section of a venue map).

At block 510, a first and a second listing may be retrieved based on the search request. For example, the server may recall the first and second listings from a storage device of the server housing a network-based commerce system, or may request and receive the listings from another computer system.

At block 515, a similarity score may be determined between the first and second listings. The determination may be based on properties common to the first and second listings. Such a determination may be performed by the server. In some embodiments, a weighting factor may be used in determining the similarity score.

At block 520, a determination may be made as to which of the first and second listings is superior. For example, the server may compare one or more of the values of the properties of the first and second listing that are common to both listings to determine which is superior. In some embodiments, a weighting factor may be used in determining the similarity score.

At block 525, instructions to generate a user interface may be generated that includes the first listing to be displayed at a remote device. For example, the server may generate the instructions to instruct the remote device to generate a user interface.

At block 530, instructions to generate an interactive visual element depicting the first and the second listings as part of the user interface may be generated. For example, a venue map or section map with which a user may interact may be part of the user interface.

At block 535, instructions to generate a window that overlays part of the interactive visual element may be generated. Such a window may display a list of results.

At block 540, the second listing may be excluded from the list of results displayed on the user interface based on the similarity score exceeding the threshold and the first listing including superior values of the properties common to the first and second listings. For example, instructions generated by the server may exclude the second listing in the list displayed in the window because the first listing has superior values. As another example, the instructions generated by the server may include the second listing but may flag the second listing such that it is not displayed on the remote device in the list of results.

At block 545, the instructions to generate the user interface may be transmitted to the remote location. For example, the server may transmit the instructions to generate the user interface over a network to the device that submitted the request at block 505.

At block 550, an additional search may be performed in response to the user at the remote location selecting a region of the interactive visual element. For example, if a user were to select a particular section of a venue map, the server may run an additional query specific to that section.

At block 555, a third listing and a fourth listing may be retrieved based on the additional search. For example, the third and fourth listings may be listings from the particular section selected by the user.

At block 560, a second similarity score may be determined between the third and fourth listings based on properties common to the third and fourth listings. The block 560 may be similar or comparable to the block 515, although between the third and fourth listings rather than the first and second listings.

At block 565, instructions may be generated to update the window to include the third listing and exclude the fourth listing based on the second similarity score exceeding a threshold and the third listing including superior values in the properties common to the third and fourth listings. For example, based on the instructions, the window may add the third listing to the first listing, or may add the third listing and remove the first listing. In some embodiments, a weighting factor may be used in determining whether the third or fourth listing is superior.

Accordingly, the method 500 may remove listings based on similarity. Modifications, additions, or omissions may be made to the method 500 without departing from the scope of the present disclosure. For example, any of the blocks 530, 535, 545, 550, 555, 560, and/or 565 may be omitted. As another example, the operations of the method 500 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

As indicated above, the embodiments described herein may include the use of a special purpose or general purpose computer including various computer hardware or software modules, as discussed in greater detail below. Further, as indicated above, embodiments described herein may be implemented using computer-readable media for carrying or having computer-executable instructions or data structures stored thereon.

In some embodiments, the different components, modules, engines, and services described herein may be implemented as objects or processes that execute on a computing system (e.g., as separate threads). While some of the system and methods described herein are generally described as being implemented in software (stored on and/or executed by general purpose hardware), specific hardware implementations or a combination of software and specific hardware implementations are also possible and contemplated.

In some embodiments, the present disclosure may include a method of generating a user-interface to be displayed at a remote location. The method may include receiving a search request for an item listing and retrieving a first listing and a second listing based on the search request. The method may also include determining a similarity score between the first and the second listing based on multiple properties common to the first and the second listings. The method may additionally include generating a user interface to be displayed at a remote location that includes the first listing. The method may also include excluding the second listing from a list of results displayed on the user interface based on the similarity score exceeding a threshold and the first listing including superior values in at least one of the plurality of properties common to the first and second listings. The method may also include transmitting the user interface to the remote location for display.

In some embodiments in accordance with the present disclosure, generating the user interface may also include generating an interactive visual element depicting the first and the second listings as part of the user interface, and generating a window overlaying at least a portion of the interactive visual element, the window displaying the list of results.

In some embodiments in accordance with the present disclosure, the interactive visual element may include a map of seats for an event.

In some embodiments in accordance with the present disclosure, the map may include a first seat corresponding to the first listing depicted in a first color and a second seat corresponding to the second listing depicted in a second color.

In some embodiments in accordance with the present disclosure, a method may also include, in response to a user selection of a region of an interactive visual element at the remote location, running an additional search. Such a method may also include retrieving a third listing and a fourth listing based on the additional search, determining a second similarity score between the third and the fourth listings based on multiple properties common to the third and the fourth listings, and updating the window to include the third listing and exclude the fourth listing based on the second similarity score exceeding a threshold and the third listing including superior values in at least one of the multiple properties common to the third and fourth listings.

In some embodiments in accordance with the present disclosure, the user interface additionally displays one or more values of the multiple properties of the first listing.

In some embodiments in accordance with the present disclosure, the similarity score is based on a user pre-selecting the threshold.

In some embodiments in accordance with the present disclosure, the threshold is based on display properties of a display device at the remote location, and the threshold may exclude additional listings for lower display properties of the display device.

In some embodiments in accordance with the present disclosure, a method may also include utilizing a weighting factor for at least one of the multiple properties to determine at least one of the similarity score or that the first listing has superior values, and the weighting factor may be pre-selected by a user.

In some embodiments in accordance with the present disclosure, the plurality of properties may include at least two of date, price, seat, row, section, proximity, view, delivery method, or payment method.

In some embodiments in accordance with the present disclosure, a non-transitory computer-readable medium may include instructions that, when executed by one or more processors, are configured to control operations. The operations may include steps or operations associated with methods in accordance with the present disclosure.

In some embodiments, the present disclosure may include a system that may include a device at a first location, the device including a display with display properties, and a server at a second location remove from the device. The server may include a processor and computer-readable instructions that, when executed by the processor, are configured to receive a search request for an item listing from the device and retrieve a first listing and a second listing based on the search request. The instructions may be further configured to determine a similarity score between the first and the second listings based on multiple properties common to the first and the second listings, and generate a user interface to be displayed at a remote location, the user interface including the first listing. The instructions may also be configured to exclude the second listing from the user interface based on the similarity score exceeding a threshold and the first listing including superior values in at least one of the multiple properties common to the first and second listings, and the threshold may be determined based on the display properties of the device. The instructions may additionally be configured to transmit the user interface to the device for display.

In some embodiments in accordance with the present disclosure, the threshold may be selected to exclude additional listings for lower display properties of a display.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc., connote a specific order, these terms should not be understood to connote a specific order.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of generating a user interface to be displayed at a remote location, the method comprising:
receiving a search request for an item listing for an event;

retrieving a first listing for the event and a second listing for the event from a listing database based on the search request;

determining a similarity score between the first listing for the event and the second listing for the event based on a plurality of properties common to the first listing for the event and the second listing for the event;

responsive to the similarity score satisfying a threshold, determining the first listing for the event as superior relative to the second listing for the event based on a comparison of at least two properties selected by a user between the first listing for the event and the second listing for the event, the properties comprising date, price, seat, row, section, proximity, view, delivery method, or payment method;

generating instructions to be transmitted to a remote location to generate a user interface to be displayed at the remote location, the user interface providing a list of results including the first listing for the event, the instructions excluding the second listing for the event from the list of results displayed on the user interface based on the similarity score satisfying the threshold and determining the first listing for the event as superior relative to the second listing for the event;

transmitting the instructions to the remote location;

generating an interactive visual element depicting the first and the second listings as part of the user interface;

generating a window overlaying at least a portion of the interactive visual element, the window displaying the list of results;

in response to a user selection of a region of the interactive visual element at the remote location, running an additional search; and transmitting second instructions to the remote location to update the window to include results of the additional search.

2. The method of claim 1, wherein the interactive visual element includes a map of seats for the event.

3. The method of claim 2, wherein the map includes a first seat corresponding to the first listing depicted in a first color and a second seat corresponding to the second listing depicted in a second color.

4. The method of claim 1, further comprising:

retrieving a third listing for the event and a fourth listing for the event based on the additional search;

determining a second similarity score between the third listing for the event and the fourth listing for the event based on a plurality of properties common to the third listing for the event and the fourth listing for the event; and transmitting second instructions to the remote location to update the window to include the third listing for the event in the list of results and exclude the fourth listing for the event from the list of results based on the second similarity score exceeding the threshold.

5. The method of claim 1, wherein the user interface additionally displays one or more values of the plurality of properties of the first listing for the event.

6. The method of claim 1, wherein the similarity score is based on a user pre-selecting the threshold.

7. The method of claim 1, wherein the threshold is based on display properties of a display device at the remote location, the threshold excluding additional listings for lower display properties of the display device.

8. The method of claim 1, further comprising utilizing a weighting factor for at least one of the plurality of properties to determine at least one of the similarity score or that the first listing for the event as superior relative to the second listing for the event, the weighting factor pre-selected by a user.

9. The method of claim 1, wherein the plurality of properties include at least two of date, price, seat, row, section, proximity, view, delivery method, or payment method.

10. A non-transitory computer-readable medium including instructions that, when executed by one or more processors, are configured to control operations, the operations including:

receiving a search request for an item listing for an event;

retrieving a first listing for the event and a second listing for the event from a listing database based on the search request;

determining a similarity score between the first listing for the event and the second listing for the event based on a plurality of properties common to the first listing for the event and the second listing for the event;

responsive to the similarity score satisfying a threshold, determining the first listing for the event as superior relative to the second listing for the event based on a comparison of at least two properties selected by a user between the first listing for the event and the second listing for the event, the properties comprising date, price, seat, row, section, proximity, view, delivery method, or payment method;

generating second instructions to be transmitted to a remote location to generate a user interface to be displayed at the remote location, the user interface providing a list of results including the first listing for the event, the second instructions excluding the second listing for the event from the list of results displayed on the user interface based on the similarity score a satisfying the threshold and determining the first listing for the event as superior relative to the second listing for the event;

transmitting the second instructions to the remote location;

generating an interactive visual element depicting the first and the second listings as part of the user interface;

generating a window overlaying at least a portion of the interactive visual element, the window displaying the list of results;

in response to a user selection of a region of the interactive visual element at the remote location, running an additional search; and transmitting second instructions to the remote location to update the window to include results of the additional search.

11. The computer-readable medium of claim 10, wherein the interactive visual element includes a map of seats for the event.

12. The computer-readable medium of claim 11, wherein the map includes a first seat corresponding to the first listing depicted in a first color and a second seat corresponding to the second listing depicted in a second color.

13. The computer-readable medium of claim 10, wherein the operations further comprise:

retrieving a third listing for the event and a fourth listing for the event based on the additional search;

determining a second similarity score between the third listing for the event and the fourth listing for the event based on a plurality of properties common to the third listing for the event and the fourth listing for the event; and transmitting third instructions to the remote location to update the window to include the third listing for the event in the list of results and exclude the fourth listing for the event from the list of results based on the second similarity score exceeding the threshold.

14. The computer-readable medium of claim 10, wherein the similarity score is based on a user pre-selecting the threshold.

15. The computer-readable medium of claim 10, wherein the operations further comprise utilizing a weighting factor for at least one of the plurality of properties to determine at least one of the similarity score or the first listing for the event as superior relative to the second listing for the event, the weighting factor pre-selected by a user.

16. The computer-readable medium of claim 10, wherein the plurality of properties include at least two of date, price, seat, row, section, proximity, view, delivery method, or payment method.

17. A system comprising:
a server at a location remote from a device, the server including:
a processor; and
computer-readable instructions that, when executed by the processor, are configured to:
receive, from the device, a search request for an item listing for an event;
retrieve a first listing for the event and a second listing for the event from a listing database based on the search request;
determine a similarity score between the first listing for the event and the second listing for the event based on a plurality of properties common to the first listing for the event and the second listing for the event;
responsive to the similarity score satisfying a threshold, determine the first listing for the event as superior relative to the second listing for the event based on a comparison of at least two properties selected by a user between the first listing for the event and the second listing for the event, the properties comprising date, price, seat, row, section, proximity, view, delivery method, or payment method;
generate second instructions to be transmitted to the device to instruct the device to generate a user interface to be displayed at the device, the user interface providing a list of results including the first listing for the event, the second instructions excluding the second listing for the event from the list of results displayed on the user interface based on the similarity score a satisfying the threshold and determining the first listing the event as superior relative to the second listing for the event;
transmit the instructions to the device;
generate an interactive visual element depicting the first and the second listings as part of the user interface;
generate a window overlaying at least a portion of the interactive visual element, the window displaying the list of results;
in response to a user selection of a region of the interactive visual element at the remote location, run an additional search; and
transmit second instructions to the remote location to update the window to include results of the additional search.

18. The system of claim 17, wherein the threshold is selected to exclude additional listings for lower display properties of the display.

19. The system of claim 17, wherein the similarity score is based on a user pre-selecting the threshold.

20. The system of claim 17, wherein the plurality of properties include at least two of date, price, seat, row, section, proximity, view, delivery method, or payment method.

* * * * *